United States Patent [19]

Birchall et al.

[11] 4,320,074

[45] Mar. 16, 1982

[54] PROCESS FOR PREPARING SHAPED BODY OF ALUMINA

[75] Inventors: James D. Birchall; Michael J. Morton, both of Runcorn, England

[73] Assignee: Imperial Chemical Industries Limited, London, England

[21] Appl. No.: 40,314

[22] Filed: May 18, 1979

Related U.S. Application Data

[63] Continuation of Ser. No. 337,847, Mar. 5, 1973, abandoned.

[30] Foreign Application Priority Data

Mar. 15, 1972 [GB] United Kingdom ............... 12088/72

[51] Int. Cl.$^3$ .......................... B29C 6/00; C04B 35/02
[52] U.S. Cl. ........................................... 264/8; 264/63; 264/65; 264/164; 264/DIG. 19; 423/625; 423/630; 423/631; 501/95; 501/127
[58] Field of Search .................... 264/63, 65, DIG. 19, 264/232, 8, 164; 106/73.4; 423/625, 630, 631

[56] References Cited

U.S. PATENT DOCUMENTS

| | | | |
|---|---|---|---|
| 3,311,481 | 3/1967 | Sterry et al. | 264/63 |
| 3,560,408 | 2/1971 | Kiehl et al. | 264/63 |
| 3,652,749 | 3/1972 | Sobel et al. | 264/63 |
| 3,992,498 | 11/1976 | Morton et al. | 264/63 |
| 4,094,690 | 6/1978 | Morton | 264/63 |

*Primary Examiner*—Jay H. Woo
*Attorney, Agent, or Firm*—Cushman, Darby & Cushman

[57] ABSTRACT

The process relates to the preparation of a shaped body having at least one dimension less than 100 microns and comprising alumina or an alumina hydrate. An aqueous composition comprising a water-soluble aluminum compound, for example aluminum chloride, sulphate, acetate, formate, propionate, oxalate, phosphate or nitrate and a water-soluble organic polymer is formed into the desired shape. The body so formed is dried, and is subjected to hydrothermal treatment at a temperature of at least 200° C. to decompose the aluminum compound to alumina or an alumina hydrate. The body is optionally further heated subsequent to the hydrothermal treatment.

28 Claims, No Drawings

PROCESS FOR PREPARING SHAPED BODY OF ALUMINA

This is a continuation of application Ser. No. 337,847, filed Mar. 5, 1973 now abandoned.

This invention relates to alumina and in particular to shaped bodies comprising alumina.

According to the present invention there is provided a process for the preparation of a shaped body of thin cross section comprising alumina or an alumina hydrate which includes the steps of (a) forming into the desired shape of body a composition comprising an aluminium compound decomposable to alumina, an organic polymer in an amount by weight less than the aluminium compound and a solvent for the aluminium compound and the organic polymer;

(b) removing at least part of the solvent from the body so formed, and (c) subjecting the body to hydrothermal treatment to decompose at least partially the aluminium compound to alumina or an alumina hydrate.

It is to be understood that the aluminium compound may form a true solution or a colloidal solution (a sol) with the solvent.

Preferably the composition contains at least twice as much aluminium oxide equivalent as organic polymer. More preferably the organic polymer comprises less than 10% by weight of the aluminium oxide equivalent of the aluminium compound, for example from 0.1% to 8% by weight.

The aluminium compound is preferably polymeric or capable of forming a polymeric compound in solution; more preferably it is a water-soluble compound, for example an aluminium salt which gives a viscous solution or sol in water. Conveniently the water-soluble aluminium compound may be a compound selected from the group consisting of the chlorides, sulphates, acetates, formates, propionates oxalates, phosphates and nitrates or mixtures thereof. Especially preferred are aluminium oxychloride, basic aluminium acetate, basic aluminium formate, basic aluminium nitrate, mixtures thereof or mixed compounds thereof.

The solvent is preferably a polar solvent, for example an alcohol, especially methanol or ethanol, glacial acetic acid, dimethylsulphoxide or dimethylformamide. It is especially convenient to use water as the solvent. Mixtures of solvents may be used.

The organic polymer is preferably a water-soluble organic polymer, conveniently a non-ionic water-soluble organic polymer, a polyhydroxylated organic polymer of a natural water-soluble gum. The organic polymer is preferably thermally-stable under the conditions of fibrising for example from ambient temperature to within several degrees of the boiling point of the solvent. Examples of preferred organic polymers include:

polyvinyl alcohol
polyacrylamide and partially hydrolysed polyacrylamide
polyacrylic acids
polyethylene oxides
carboxyalkyl celluloses, for example carboxymethyl cellulose
hydroxyalkyl celluloses, for example hydroxymethyl cellulose
alkyl celluloses, for example methyl cellulose
hydrolysed starches
dextrans
guar gum
polyvinyl pyrrolidones
polyethylene glycols
alginic acids
polyisobutylene derivatives
copolymers of polysiloxanes, for example with polyethylene oxide
polyurethanes, and
esters copolymers or mixtures thereof.

Most preferred organic polymers are straightchain polyhydroxylated organic polymers, for example polyvinyl alcohol (partially hydrolysed polyvinyl acetate); polyvinylpyrrolidone; or polyethylene oxide.

Conveniently the molecular weight of the organic polymer is in the range $10^3$ to $10^7$, preferably as high a molecular weight as is consistent with the ability of the organic polymer to dissolve in the solvent used in the process of the invention. For example, it is preferred for the polyvinyl alcohol or partially hydrolysed polyvinyl acetate to have a medium or high molecular weight, for example from 75,000 to 125,000, the polyethylene oxide to have a molecular weight of $10^4$ to $10^6$ and the polymers derived from cellulose to have a molecular weight of 10,000 to 50,000.

It is preferred that the concentration of organic polymer in the composition be from 0.1% to 10% by weight, more preferably from 0.5% to 3% by weight.

The composition may conveniently be prepared by dissolving the aluminium compound and the organic polymer in the solvent. The order in which dissolution is carried out is not critical, and may be chosen for maximum convenience in each embodiment. An aqueous sol may conveniently be made by hydrolysis or heating of an aqueous solution of the aluminium compound. The aluminium compound and the organic polymer may be formed from suitable precursors, usually in the presence of the solvent. Thus the aluminium compound may be prepared by dissolving aluminium hydroxide in the appropriate acid in such proportion to give a basic salt, for example $Al(OH)_5Cl$ may be made by dissolving aluminium hydroxide in hydrochloric acid, aluminium metal in aqueous hydrochloric acid or aluminium ethoxide in aqueous hydrochloric acid.

The composition is prepared at any viscosity suitable for forming the composition into the desired shape of body. Viscosities of greater than 0.1 poise, for example from 0.1 poise to 5000 poise, are generally convenient for the processes of forming the shaped body.

The shaped body should consist of sections thin enough for the hydrothermal treatment to take effect in a reasonable time. Bodies having at least one dimension not greater than about 100 microns are especially suitable. The shaped bodies most usefully prepared by the processes of the invention are therefore small particles and spheroids; porous structures and honeycombs and especially films, coatings and fibres, having at least one dimension not greater than about 100 microns.

Any convenient method for forming the composition into the desired shape may be employed; for small particles and spheroid, spray-drying or prilling processes (for example in air or by an oil drop method) are suitable; for films, extrusion or casting techniques are convenient; for porous structures, a suitable foaming process or honeycomb formation technique may be used; for fibres, any convenient method of fibrising may be used, for example centrifugal spinning, drawing, blowing, tack-spinning, extrusion through a spinneret or suitable combinations thereof. Fibrising by blowing is effected as hereinafter described.

The viscosity of the composition used to form fibres is preferably one suited to the fibrising method employed. Conveniently the viscosity is in the range 0.1 to 3000 poise, preferably 100 to 1000 poise when fibrising is effected by extrustion of the composition through a spinneret to form a continuous filament. Fibrising of compositions of low viscosity, for example 0.1 to 100 poise, is preferably carried out by a blowing process as hereinafter described.

It is preferred to remove solvent from the formed body by evaporation, for example by heating at a temperature from 30° C. to 110° C., optionally under reduced pressure.

By hydrothermal treatment is meant the simultaneous action on the formed body of heat and water vapour. The hydrothermal treatment may be effected at the same time as the removal of solvent from the body, or as a subsequent separate step.

Hydrothermal treatment of bodies prepared from aqueous solution may be effected by heating them above 100° C. in an enclosed space so that the steam produced on dehydration of the bodies is available to treat the bodies. It is preferred, however, to effect hydrothermal treatment with added steam at a temperature of at least 200° C. It is preferred to use steam at a temperature of 200° C. to 800° C., most preferably at a temperature of 250° C. to 500° C., for example substantially 350° C. The time of heating in steam may be varied over wide limits; preferably heating times of two minutes to five hours are used, most preferably two minutes to thirty minutes. The pressure of steam used may be varied widely, for example from 0.5 to 50 atmospheres, but the steam is most conveniently used at atmospheric pressure. The steam may contain other gases, for example air; it is preferable that the proportion of the gases in the steam does not exceed 50% by volume and most preferably does not exceed 10% at substantially atmospheric pressure.

It is preferred to heat the shaped body before treatment with steam in order to prevent condensation on the shaped body.

While not wishing to be restricted to any particular theory, we believe that in the hydrothermal treatment of bodies containing some water-soluble organic polymers water vapour prevents de-hydration of the polymer or its decomposition products and thereby avoids charring. Charring before the decomposition of the alumina compound is undesirable as, apart from producing a black colouration which is difficult to remove entirely by calcination, it adversely affects the structure and physical properties of the alumina. In addition we believe that the hydrothermal treatment allows the alumina compound to decompose in a homogeneous manner, leading to a more uniform crystalline structure in the alumina produced. The presence of the organic polymer creates a greater porosity in the alumina and allows quicker removal of the anion which is released on decomposition. The presence of the organic polymer also appears to assist the action of steam used in the hydrothermal treatment in decomposing the aluminium compound.

The shaped body may be further heated to a temperature greater than that of hydrothermal treatment in order subsequently to complete decomposition of the aluminium compound to change the crystalline form of the alumina or to sinter the body. Thus the body may be heated at 500° C. to 2000° C., preferably at 600° C. to 1000° C., for a period from one minute to one hour. Heating may be carried out in stages, for example in successive steps of increasing temperature. Heating in the presence of air or oxygen is desirable when it is required to oxidise any residual organic material present in the body.

Various additives may be included in the shaped body, singly or in combination, conveniently by adding them to the composition from which the shaped body is formed. Additives may also be included on the surface of the body by any suitable treatment process. Examples of additives which may be included are:

(a) alkaline earth compounds, for example compounds of magnesium or calcium, decomposable to alkaline earth oxides;

(b) acid oxides, especially $SiO_2$, $B_2O_3$ or $P_2O_5$, $ZrO_2$ or compounds which decompose to form acid oxides;

(c) catalyst materials, for example Pt, Sb, Cu, Al, Pd, Ag, Ru, Bi, Zn, Ni, Co, Cr, Ti, Fe, V or Mn in elemental or compound form;

(d) fluorides, for example HF, NaF or $CaF_2$;

(e) alkali metal compounds for example compounds of lithium, sodium or potassium;

(f) reinforcing particles or fillers such as colloidal silica;

(g) colouring agents, for example mordant dyes or pigments;

(h) rare earth oxides or yttria or precursors thereof.

The catalyst material may be present on the external surface of the shaped body or it may be included within the body. In some embodiments, the catalyst material may be partly within the body and partly on its external surface. One or more catalyst materials may be present.

When at least part of the catalyst material is included in the body, it is convenient to disperse or dissolve the catalyst material, or a precursor therefor, in the composition from which the shaped body comprising alumina or alumina hydrate is formed. By precursor is meant a material which when suitably treated, for example by heating or reduction, will generate a catalyst material, directly or indirectly. Alumina or alumina hydrate bodies comprising a catalyst material may be used in a wide variety of catalytic processes as hereinafter described.

The alumina in the shaped body is either noncrystalline or predominantly in its eta form or both. We believe that the process avoids the formation of other transitional crystal forms of alumina, for example chi-alumina, and prevents the formation of alpha-alumina at temperatures below 1000° C. and thereby improves the resistance to physical change on subjecting the body to temperature changes. The invention thus provides a shaped body, for example a fibre, of alumina substantially free of alpha-alumina when heated at a temperature of 800° C. to 1200° C.

The preferred shaped body is a fibre formed by fibrising the composition by a suitable method. Fibrising by extrusion through a spinneret is especially useful in producing continuous fibre. Staple fibre is conveniently produced by centrifugal spinning, tack-spinning or blowing. Fibrising is most conveniently carried out at the ambient temperature, but is desired it may be carried out at any other temperature at which the fibrising composition is stable. For example, it may be convenient in some embodiments to vary the temperature in order to produce the viscosity of the composition appropriate for fibrising.

Fibrising by blowing comprises extruding the fibrising composition, especially an aqueous composition, through one or more apertures into at least one gas stream having a component of high velocity in the direction of travel of the extruded composition. The dimensions of the aperture through which the fibrising composition is extruded may vary widely. We prefer to use an aperture having at least one dimension larger than 50 microns and smaller than 500 microns. The aperture may have a variety of shapes, for example we have used circular, triangular and star-shaped apertures. It is convenient in some embodiments to extrude the fibrising composition through a slit, which may be substantially straight or curved, for example in the case of an annular slit. A plurality of apertures may be used in one extrusion head. The material in which the aperture is formed may be chosen from a wide variety of substances. A metal, for example stainless steel or monel, is especially useful. Owing to the fact that the fibrising composition may be at or near ambient temperature during extrusion and that low extrusion pressures are used, it is convenient, especially from the point of view of cheapness, to use a plastics material in which to form the aperture; suitable plastics materials include polystyrene, polypropylene, polyvinyl chloride and polytetrafluoroethylene.

It is preferred to use two gas streams which converge at or near the point where the fibrising composition is extruded from the aperture; preferably the angle between the converging gas streams is from 30° C. to 60° C. In preferred embodiments, gas streams emerge from slots on each side of a row of apertures or a slit; or a conically-shaped gas stream emerges from an annular slot arranged substantially concentrically around an annular extrusion slit. The velocity of the gas stream may be varied over a wide range; we prefer to use velocities in the region of 40 to 1500 ft per second. Air is the preferred gas, most conveniently air at ambient temperature.

The viscosity of the fibrising composition is preferably less than 3000 poise, most preferably from 0.1 to 100 poise, especially when fibres of very small diameter are desired.

The extruded composition is drawn down by the action of the gas stream upon it. A draw-down factor of about 20 is usual. In order for this draw-down to be effected, especially for very fine fibres (e.g. 0.5–10 microns), it is preferred that the viscosity of the extruded composition be maintained substantially constant, or not increased too much during the draw-down stage. This means that loss of solvent from and/or gelling of the composition should be suitably controlled. Such control may conveniently be effected by a suitable choice of velocity, temperature or, more especially, the degree of saturation of solvent in the gas stream, or a combination of two or more of these factors. In order to reduce the loss of solvent from the composition to a minimum, as is normally required, it is useful to use a gas which is saturated, or almost so, e.g. above 60% saturation, with the solvent vapour. For fibrising aqueous compositions, a gas for example air, at a relative humidity of at least 80% is especially useful.

The distance separating the point of emergence of the gas stream from the extrusion aperture should be as small as possible; we prefer that the distance between the closest edges of the aperture and the air slot be less than 0.25 mm.

The pressure employed to extrude the fibrising composition will depend on the viscosity of the composition, the size and shape of the aperture and the desired rate of extrusion. We find that pressures from 16 to 120 lb per square inch absolute are convenient for compositions having viscosities up to about 100 poise.

The fibre may be dried further after attenuation in the gas stream if required. The fibre is then subjected to hydrothermal treatment as hereinbefore described, preferably after collection in the form of a loose blanket. The fibre may also optionally be subjected to further processing which may be required, for example it may be heated to complete the decomposition of the aluminium compound to alumina or alumina hydrate or to decompose any residual organic polymer in the fibre, to change the crystalline form of the alumina or to sinter the fibre. Typically, the fibre may be heated at a temperature from 500° C. to 1200° C. for a period of from one minute to one hour, preferably 500° C. to 800° C. for one minute to one hour.

Various additives as hereinbefore described may be included in or on the external surface of a fibre prepared according to the invention, singly or in any combination, conveniently by adding them to the fibrising composition or by including them on the surface of the fibre by any suitable treatment process.

Thus the fibres may be coated with a size, such as polyvinyl alcohol or stearic acid. They may be immersed in a solution of ethyl silicate, washed and heated to give a fibre containing silica. They may also be soaked in solutions of metal compounds, for example magnesium ethoxide in ethanol, and the treated fibres heated to give a fibre containing additional refractory metal oxide. The fibres may be given a silicone treatment, for example by applying a chlorosilane (in vapour or solution form) to the fibre surface.

Especially conveniently a catalyst material may be dispersed in the fibrising composition by dissolving it, or its precursor, in the said composition. In preferred embodiments of the invention water-soluble materials, for example salts of catalytic metals, especially metal nitrates, are dissolved in aqueous fibrising compositions.

Dispersion of the catalyst material in the fibrising composition may also conveniently be carried out my mixing insoluble or partly soluble particulate catalyst material with the fibrising composition. Preferably the mean size of particles thus dispersed should be smaller than the mean diameter of the fibre produced, and more particularly the particles should be of colloidal size.

Any desired quantity of catalyst material may be dispersed in the fibrising composition provided that the fibre formed is still sufficiently strong and coherent for use as a fibrous catalyst. We find that up to about 10% of a catalyst material may be incorporated in the fibre without serious deterioration in fibre properties.

It is preferred that the catalyst material be chemically compatible with the constituents of the fibrising composition. When the fibre is heated as herein described, it is preferable for the catalyst material to be stable at the temperature of heating. In the case of a catalyst material precursor, it is frequently convenient for the catalyst to be formed from the said precursor during heating of the fibre.

The catalyst material may be incorporated into the fibre by soaking the said fibre in a solution of the catalyst material or a catalyst material precursor in a suitable solvent and subsequently removing the said solvent from the fibre. Water is a suitable solvent for many catalyst materials or their precursors, for example metal salts. A fibre may be soaked before or after it is heated to form a fibre of different composition as herein described.

The catalyst material may conveneintly be deposited in a suitable form on at least part of the fibre surface. For this purpose it may, if desired, be bonded to the said surface by means of a binding agent, which may itself be a catalyst material, for example aluminium phosphate. Bonding may also be effected by means of an application of fibrising composition to the said surface or to the catalyst material or both, and removal of the solvent of the said composition.

In embodiments in which no binder is used to assist adherence of the catalyst material to the fibre surface, it is often possible to bring about some chemical interaction between the catalyst material and the fibre to improve bonding. In most embodiments of the invention, however, it is satisfactory merely to deposit the catalyst material on the fibre surface in a form sufficiently fine that the normal forces of physical attraction take effect. Thus it is convenient to deposit the catalyst material from a mist or vapour comprising the catalyst material or its precursor. Most conveniently the catalyst material or its precursor is deposited on the fibre surface by treating the said surface with a dispersion comprising the catalyst material or its precursor and a suitable liquid and drying. A solution of the catalyst material or its precursor in a volatile solvent is especially useful. In cases when the catalyst material is dispersed in a liquid which does not dissolve it, it is preferred that the catalyst material be in a finely-divided form, most preferably having a mean size less than 0.5 micron.

The fibre comprising a catalyst material may be further treated, for example to bring about desired changes in the catalyst material. For example, in cases where a catalyst material precursor has been incorporated in or on the fibre, it will be necessary to generate the active catalyst material by a suitable process. The processes normally used include chemical reaction to form a different compound, reduction and heating. Some of these processes, especially heating, may be combined with hydrothermal treatment or heating the fibre to decompose the aluminium compound or the organic polymer of the fibrising composition. Treatment of the fibre to achieve desirable physical changes in the catalyst material may also be carried out; for example, changes in surface area or crystal structure may be desirable to achieve specific catalytic effects. Treatment of the fibre to eliminate undesirable substances, for example catalyst poisons, may be useful in some embodiments.

The invention thus provides a fibre comprising alumina or an alumina hydrate which may be in continuous or discontinuous lengths, although discontinuous fibres may have very high ratios of length to diameter, for example greater than 5000. The fibres are generally of small diameter, typically from 0.5 to 5.0 microns. As a result of the avoidance of formation of undesirable crystal forms of alumina as hereinbefore referred to, the fibres show remarkable resistance to physical change at high temperature, for example from 700° C. to 1200° C. In general, the fibres heated at 500° C. to 800° C. do not have a very high surface area, a BET surface area of less than 50 m$^2$/g being consistently observed, and figures of 5 m$^2$/g to 30 m$^2$/g being the usual measured range after one hour of heating at 500° C. to 800° C. The fibres may be collected as individual fibres or they may be collected in the form of a yarn, mat, blanket or felt. Mats, blankets or felts are conveniently formed by collecting the fibres on a moving band, preferably a band of foraminous material, for example steel mesh. The fibres may be collected on a mould to provide a shaped felt. If desired the fibres may be bonded together, for example by collecting the fibres before they are dry and heating the resultant mat or felt. Bonding may also be effected by the use of a binding agent. The mat or felt may be compressed, if desired, for example to increase its density. The invention is especially useful in preparing glassy fibres. Fibres spun into yarn may be made up as cloth.

The fibres produced according to the invention may be used for a variety of purposes. They may be used, for example, as high temperature insulation materials or as catalyst supports in high temperature reactions. The fibres may generally be used as fillers; reinforcement for resins, metals and ceramics; fillers; catalyst supports or fibrous catalysts.

Fibrous catalysts according to the invention comprising the metals copper, ruthenium, nickel, palladium platinum or silver, or combinations thereof, are especially useful in processes such as the following: dehydration of alcohols
methanol synthesis
reduction of nitrobenzene
ammonia decomposition
steam reforming of naphtha or natural gas
hydrogenation of olefins, aromatics, nitrides, fats and oils
sulphur dioxide oxidation
hydrodealkylation
methane ammoxidation
ethylene oxide from ethylene
formaldehyde from methanol.

Semiconductor oxides are useful catalyst materials. For example, $Cr_2O_3$ "eta" alumina may be used for paraffin dehydrogenation of naphtha reforming.

Metallic halides, for example $Cu Cl_2$, $SbCl_3$, $AlCl_3$ or $CrCl_3$, provide fibrous catalysts which are useful for a variety of chlorination and oxychlorination reactions or isomerisation of paraffins, olefins and aromatics.

Organo-metallic catalysts may be best employed in the invention by soaking or coating of the pre-formed fibre. The fibrous catalysts are useful in producing ethylene oligomers, polyethylenes and polyesters. Metal carbonyls, for example $HCO(CO)_4$, provide fibrous catalysts suitable for carrying out OXO processes.

The fibrous catalysts, especially those containing platinum, palladium, molybdenum, $Co_3O_4$, $V_2O_5$, or $Cr_2O_3$, $MnO_2$, $Fe_2O_3$ or $NiO$, or combinations thereof, may be used in the treatment of car exhaust gases, for example in an afterburner.

Other catalytic materials found useful include:
cobalt molybdate
nickel molybdate
bismuth molybdate
copper molybdate
zinc chromite
cobalt oxide, $CO_3O_4$.

Fibrous catalysts according to the invention are advantageous owing to their high external surface areas; they are heat-resistant and mechanically strong.

The invention is thus useful in producing shaped bodies comprising alumina or alumina hydrate, especially fibres which may be of very small diameter, dense, white, strong and of high modulus. The bodies, especially the fibres, may conveniently be used, for example as high temperature insulating materials, fillers, as reinforcement for resins, metals and ceramic materials, inert filters, catalysts or catalyst supports.

The invention is illustrated, but not limited, by the following Examples:

EXAMPLE 1

A solution was prepared from the following components:

150 g aluminium oxychloride solution (20% w/w $Al_2O_3$)
89 g polyvinyl alcohol solution (2% w/w PVA)
0.4 g glacial acetic acid.

Analysis of the aluminium oxychloride solution gave an Al:Cl ratio of 1.8:1.

The solution was filtered and evaporated to a viscosity of 20 poise. Fibres were formed by extrusion through 250 micron holes followed by attenuation of the liquid jets so formed with convergent streams of saturated air. The fibres so formed reached the glassy-gel state at a diameter of three microns as a result of evaporation by entrained secondary air.

The fibres were collected, dried at 100° C. and heated for fifteen minutes at 350° C. in an atmosphere of steam, followed by treatment in air at 800° C. for five minutes. The products were strong, white and flexible, with a mean diameter of between 2 and 3 microns, and a specific BET surface area of 8 $m^2/g$ as measured by nitrogen absorption.

A sample of these fibres was heated for 26 hours at 1000° C. after which they were shown to have retained their strength and flexibility.

EXAMPLE 2

Fibres were prepared from a solution as in Example 1 but from a fibrising composition in which additionally 3 g of anhydrous magnesium chloride had been co-dissolved. The fibres so formed were subjected to steam for thirty minutes at 350° C. at atmospheric pressure and fired to 1000° C. in air for five minutes to give strong, white, flexible fibres. No trace of alpha-alumina was detected by X-ray diffraction.

EXAMPLE 3

A solution of aluminium oxychloride having an Al:Cl ratio of 1.8:1 was prepared by dissolving powdered aluminium metal in hydrochloric acid at 80° C. to give a viscosity of 0.42 poise and a solids content as $Al_2O_3$ of 26%. To this solution sufficient polyvinylpyrrolidone of molecular weight 700,000 was dissolved by stirring to give 6% by weight of polyvinylpyrrolidone based on the alumina content of the solution. The viscosity of the solution after three days was 10.2 poise.

This solution was spun into fibres by extruding through a small hole to form a liquid jet, attenuating this jet to approximately 4 microns with saturated air, and drying the jet with air at a relative humidity of 50% to form a fibre. The fibre was heated for fifteen minutes at 350° C. in steam at atmospheric pressure and fired for fifteen minutes at 800° C. to give an alumina fibre of specific BET surface area of 5 $m^2/g$. A similar sample of fibre heated similarly but in air at a relative humidity measured at room temperature of 40% gave a surface area of 22 $m^2/g$.

EXAMPLE 4

To a sample of solution prepared as in Example 3 containing 40 g of $Al_2O_3$, 5.66 g of anhydrous nickel chloride were added. The viscosity rose to 75 poise after 24 hours. The solution was diluted with water to a viscosity of 20 poise and spun into fibre as described in Example 3.

The fibres were heated to steam at 350° C. and fired at 850° C. to give a strong slightly greenish fibre with high catalytic activity. A sample of this fibre used at a GHSV space velocity of 55 at a temperature of 450° C. converted 78% by weight of the nitrogen of an exhaust gas mixture produced from a car engine operating at an air-fuel ratio of fourteen.

EXAMPLE 5

A solution of aluminium chlorohydrate was prepared by dissolving aluminium metal in hydrochloric acid to give an Al:Cl ratio of 1.8:1. Sufficient high-molecular weight polyvinyl alcohol (cold water soluble grade) was dissolved to give 4% by weight solution of polyvinyl alcohol based on the alumina content of the solution.

The solution was evaporated to a viscosity of 50 poise measured at room temperature and allowed to age overnight to give a viscosity of 600 poise. The viscous solution was extruded through a spinneret into air at ambient temperature and the filament so formed was wound up on a drum to give a reel of fibre having a mean diameter of 11.2 microns.

The fibres were removed from the drum, dried at 120° C. and placed in a furnace at 350° C. which was purged with steam. The fibres were removed after one hour and found to be golden brown with a mean diameter of 9.3 microns. Tensile test measurements showed that the fibre had a mean tensile strength of 70,000 pounds per square inch absolute with a standard deviation of 20,000 pounds per square inch absolute and a tensile modulus of $7 \times 10^6$ pounds per square inch absolute. On heating in air to 500° C. for one hour, the tensile strength increased to 120,000 pounds per square inch absolute which was retained after one hour at 800° C. However after the 800° C. treatment the tensile modulus had risen from $9 \times 10^6$ pounds per square inch absolute to $15 \times 10^6$ pounds per square inch absolute, and the mean fibre diameter had shrunk to 7.9 microns. At 800° C. the X-ray diffraction pattern characteristic of eta-alumina had developed.

EXAMPLE 6

Fibres were prepared from three aqueous solutions of aluminium oxychloride containing 3% by weight (based on the alumina equivalent) of polyvinyl pyrrolidone (K 60 grade) and each of the following additives.

(a) basic zirconium acetate solution sufficient to provide 5% $ZrO_2$ by weight (based on the alumina equivalent)
(b) dilute orthophosphoric acid solution sufficient to provide $P_2O_5$ by weight (based on the alumina equivalent)
(c) boric acid solution sufficient to provide 5% $B_2O_3$ by weight (based on the alumina equivalent)

In each case the solutions were evaporated on a rotary vacuum evaporator to give a viscosity of 15 poise and spun into fibres of mean diameter five microns by the blow-spinning method described in Example 1. The fibres were collected, dried at 100° C. and heated in a steam atmosphere at 350° C. for fifteen minutes. The products were fired at 900° C. for fifteen minutes.

The fibrous samples were further tested in a hot stage X-ray apparatus under similar conditions and the temperature was noted at which the first sign of alpha alumina was detected, with the following results:

| (a) $Al_2O_3$ | 5% $ZrO_2$ | 1170° C. |
|---|---|---|
| (b) $Al_2O_3$ | 5% $P_2O_5$ | 1100° C. |
| (c) $Al_2O_3$ | 5% $B_2O_3$ | 1070° C. |

In each case the major phase below the temperature indicated above was eta alumina, although with the fibre containing boric acid (c) a minor chi alumina phase was also detected.

EXAMPLE 7

A ceramic catalyst-support matrix consisting of a cube of side one inch and parallel channels with triangular cross section weighed 12 g, contained a planar surface of 200 cm$^2$ and a surface area by the BET nitrogen method of 0.5 m$^2$/g.

The matrix was coated with a thin film of alumina by dipping it into an aqueous solution containing the following components:

100 g Aluminium oxychloride (23.5% by weight based on $Al_2O_3$, Al:Cl ratio 2:1)
1 g Chloro platinic acid
1 g Polyvinyl pyrrolidone (K 90 grade)
0.1 g Glacial acetic acid.

The matrix was allowed to drain and was dried at 100° C., and introduced into an oven with a pure steam atmosphere at 380° C. After five minutes the matrix was withdrawn and fired at 900° C. for fifteen minutes.

On cooling the matrix had increased in weight by 0.8 g and BET surface area measurement now gave a surface area of 4.3 m$^2$/g based on the total weight of the matrix.

EXAMPLE 8

A high molecular weight water-soluble polyvinyl alcohol ('Elvanol' 50-42) was dissolved in aqueous commercial aluminium oxychloride solution, to give a level of 6% PVA by weight based on $Al_2O_3$. The Al:Cl ratio in the solution was 2:1.

The solution was filtered and evaporated on a rotary vacuum evaporator to a viscosity of 20 poise. The solution was fibrised using the blow-spinning method described in Example 1 to give fibres with a mean diameter of four microns.

The fibres were collected, dried for five minutes at 100° C. and heated in a steam atmosphere for fifteen minutes at 360° C. Differential Thermal Analysis (DTA) on the fibres showed a strong sharp exotherm at 880° C., which X-ray analysis showed to be caused by crystallization of the fibre to the eta alumina phase. Furthermore, hotstage X-ray investigation showed that the first trace of alpha alumina was formed at 920° C. on heating at a rate of 50° C./hour.

A sample of the pale yellow-brown steamed fibres was heated directly at 900° C. for 15 minutes to give a strong white product, with a surface area by the BET method of 70 m$^2$/g.

EXAMPLE 9

Fibres were spun as in Example 1 from an aqueous aluminium oxychloride solution (2:1 Al:Cl ratio) containing 1% w/w polyvinyl pyrrolidone. The solution contained 28.5% $Al_2O_3$ equivalent. The fibres were dried and then heated in steam at 400° C. for five minutes and fired at 900° C. for ten minutes to give a strong white product with a surface area of 80 m$^2$/g.

EXAMPLE 10

Fibres were spun from an aqueous solution of aluminium oxychloride and polyvinyl alcohol as in Example 8 but with only 3% PVA w/w $Al_2O_3$. When these fibres were dried and steamed at 360° C. for fifteen minutes the resultant fibres gave a DTA exotherm at 860° C. However on steaming for 30 minutes at 360° C. the exotherm temperature increased to 880° C. and increased in relative peak height to give a result similar to that obtained in Example 8.

EXAMPLE 11

A glassy material was obtained by evaporation of an aqueous solution of polyvinyl alcohol (low-molecular weight) an aluminium oxychloride solution in which the Al:Cl ratio was 2:1. The glass contained 3% PVA by weight based on $Al_2O_3$. The glass was dried at 100° C., and ground at room temperature to a fine powder. The powder was heated in a fluidised bed at 400° C. in steam for fifteen minutes, and fired in a crucible at 900° C. for fifteen minutes. The resultant white powder had a BET surface area of 100 m$^2$/g.

EXAMPLE 12

An aqueous solution of polyvinyl alcohol ('Elvanol' 50-42), was mixed with an aqueous commercial aluminium oxychloride solution having an Al:Cl ratio of 2:1, and the solution was evaporated to give a viscosity of 20 poise. The solution had an equivalent alumina content of 26% and a polyvinyl alcohol content of 2% w/w on the solution. Sufficient ferric chloride hexahydrate was co-dissolved to give a one half percent iron content based on the alumina content.

The fibre was spun as described in Example 1, collected, dried at 100° C. and steamed at 360° C. for fifteen minutes. On calcination at 900° C. all the carbonaceous material was burned-out within five minutes.

What we claim is:

1. A process for the preparation of a shaped body having at least one dimension less than 100 microns and comprising alumina in either noncrystalline form or in predominantly eta form or both and free of alpha-alumina which includes the steps of:
    (a) forming into the desired shape of body a composition having a viscosity in the range 0.1 to 5000 poise and comprising a water-soluble aluminum compound decomposable to alumina and selected from the group consisting of the chlorides, sulphates, acetates, formates, propionates, oxalates, phosphates and nitrates of aluminum or mixtures thereof, a water soluble organic polymer having a molecular weight in the range 10$^3$ to 10$^7$ and present in an amount by weight less than the aluminum compound, and water;
    (b) removing at least part of the water from the body so formed;
    (c) subjecting the body to hydrothermal treatment at a temperature of from 200°–800° C. for 2 minutes to 5 hours to decompose at least partially the aluminum compound to alumina or an alumina hydrate; and (d) calcining the hydrothermally treated body at a temperature of from 600° to 1000° C. for a period of one minute to one hour so as to obtain the alumina in either noncrystalline form or in predominantly eta crystalline form or both and free of alpha-alumina.

2. A process as claimed in claim 1 wherein the organic polymer comprises less than 10% by weight of the aluminium oxide equivalent of the aluminium compound.

3. A process as claimed in claim 2 wherein the organic polymer comprises from 0.1% to 8% by weight of the aluminium oxide equivalent of the aluminium compound.

4. A process as claimed in claim 1 wherein the aluminium compound is aluminium oxychloride, basic aluminium acetate, basic aluminium formate, basic aluminium nitrate, mixtures thereof or mixed compounds thereof.

5. A process as claimed in claim 1 wherein the organic polymer is a straight-chain polyhydroxylated polymer.

6. A process as claimed in claim 1 wherein the organic polymer is partially hydrolysed polyvinylacetate or polyvinylalcohol.

7. A process as claimed in claim 1 wherein the organic polymer is polyvinylpyrrolidone or polyethylene oxide.

8. A process as claimed in claim 6 wherein the partially hydrolysed polyvinylacetate or polyvinylalcohol has a molecular weight of 75,000 to 125,000.

9. A process as claimed in claim 7 wherein the polyethylene oxide has a molecular weight of $10^4$ to $10^6$.

10. A process as claimed in claim 1 wherein the hydrothermal treatment is effected at a temperature of 250° C. to 500° C.

11. A process as claimed in claim 1 wherein the duration of the hydrothermal treatment is from 2 minutes to 30 minutes.

12. A process as claimed in claim 1 wherein the composition comprises an alkaline earth compound decomposable to an alkaline earth oxide.

13. A process as claimed in claim 1 wherein the composition comprises an acid oxide or a compound decomposable to an acid oxide.

14. A process as claimed in claim 1 wherein the composition comprises a catalyst material.

15. A process as claimed in claim 14 wherein the catalyst material is Pt, Sb, Cu, Al, Pd, Ag, Ru, Bi, Zn, Rh, Ni, Co, Cr, Ti, Fe, V or Mn in elemental or compound form.

16. A process as claimed in claim 1 wherein a fibre is formed by fibrising the composition.

17. A process as claimed in claim 16 wherein fibrising is effected by centrifugal spinning, tack-spinning, extrusion through a spinneret or suitable combinations thereof.

18. A process as claimed in claim 16 wherein fibrising is effected by blowing.

19. A process as claimed in claim 18 wherein fibrising by blowing comprises extruding the fibrising composition through one or more apertures into at least one gas stream having a component of high velocity in the direction of travel of the extruded composition.

20. A process as claimed in claim 19 wherein two gas streams converge at or near the point where the composition is extruded from the aperture.

21. A process as claimed in claim 20 wherein the angle between the converging gas streams is from 30° to 60°.

22. A process as claimed in claim 19 wherein the gas is more than 60% saturated with the solvent vapour.

23. A process as claimed in claim 19 wherein the gas is air.

24. A process as claimed in claim 23 wherein the air is at a relative humidity of greater than 80%.

25. A process as claimed in claim 16 wherein a catalyst material or a precursor thereof is dissolved in the fibrising composition.

26. A process as claimed in claim 16 wherein particulate catalyst material or a precursor thereof is dispersed in the fibrising composition.

27. A process as claimed in claim 16 wherein the fibre is treated with a dispersion or solution of a catalyst material or a precursor thereof in a volatile liquid, and dried.

28. A process for preventing the formation of alpha-alumina at temperatures below 1000° C. and improving the resistance to physical change of a shaped body when said body is subjected to temperature changes, said body having at least one dimension less than 100 microns and comprising alumina in either noncrystalline form or in predominantly eta form or both and free of alpha-alumina which includes the steps of:

(a) forming into the desired shape of body a composition having a viscosity in the range 0.1 to 5000 poise and comprising a water-soluble aluminum compound decomposable to alumina and selected from the group consisting of the chlorides, sulphates, acetates, formates, propionates, oxalates, phosphates and nitrates of aluminum or mixtures thereof, a water soluble organic polymer having a molecular weight in the range $10^3$ to $10^7$ and present in an amount by weight less than the aluminum compound, and water;

(b) removing at least part of the water from the body so formed;

(c) subjecting the body to hydrothermal treatment at a temperature of from 200°–800° C. for 2 minutes to 5 hours to decompose at least partially the aluminum compound to alumina or an alumina hydrate; and (d) calcining the hydrothermally treated body at a temperature of from 600° to 1000° C. for a period of one minute to one hour so as to obtain the alumina in either noncrystalline form or in predominantly eta crystalline form or both and free of alpha-alumina.

* * * * *